Sept. 11, 1962   J. T. HAYES   3,054,051
DEVICE FOR OBTAINING A VERTICAL VELOCITY SIGNAL
Filed March 9, 1959   2 Sheets-Sheet 1

Inventor
John Trevor Hayes

By Leech & Radue
Attorneys

Sept. 11, 1962        J. T. HAYES        3,054,051
DEVICE FOR OBTAINING A VERTICAL VELOCITY SIGNAL
Filed March 9, 1959        2 Sheets-Sheet 2

John Trevor Hayes
Inventor

By Leech & Radue
Attorneys 3,054,051
Patented Sept. 11, 1962

3,054,051
DEVICE FOR OBTAINING A VERTICAL VELOCITY SIGNAL
John Trevor Hayes, Derby, England, assignor to Rolls-Royce Limited, Derby, England, a company of Great Britain
Filed Mar. 9, 1959, Ser. No. 797,914
Claims priority, application Great Britain Apr. 8, 1958
9 Claims. (Cl. 324—70)

This invention relates to a device for obtaining accurately a vertical velocity signal.

It is possible to obtain a vertical velocity signal by differentiating a height signal derived from a radio altimeter.

With most radio altimeters the height signal is accompanied by a degree of noise and to remove this noise it is necessary to incorporate a smoothing circuit. The smoothing circuit introduces a term including a time function into the height signal. Thus the height signal is no longer a true height signal and, if this signal is differentiated, it does not give a true velocity.

According to the invention, a device for obtaining a true velocity signal from a radio altimeter comprises a circuit for smoothing a height signal obtained from the altimeter, the smoothing circuit being such as to introduce into the height signal a term including a time function, a differentiating circuit for changing the height signal to a velocity signal, and an adder to which the velocity signal is fed, the device also including an accelerometer which produces an acceleration signal, means for introducing the same time function term into the acceleration signal, the resultant acceleration signal being fed to the adder and the velocity and acceleration signals being, added together algebraically in such proportions that the output is a true velocity signal, the time function term being cancelled out in the algebraic adding process.

The altimeter can be of a kind incorporating a combined transmitter-receiver unit and adapted to transmit a signal to the ground, the signal being reflected back to the receiver. The signal frequency is made to vary with time and because of the time interval between a signal leaving the transmitter and arriving back at the receiver the transmitted and received signals will, at any instant, have different frequencies. The transmitted and received signals are mixed and the resultant difference frequency varies according to the height of the altimeter above the ground. By passing the mixed signal to a counter unit, a height signal can be obtained. In the counting unit, pulses are generated and integrated to produce a direct current. Where the height signal is used for height control, a large time-constant smoothing circuit has to be employed. It is this circuit which introduces the time function term which, according to the invention, is removed.

The altimeter smoothing circuit can be a simple resistor-capacitor combination. The accelerometer can have the same time function term introduced into the acceleration signal by means of a resistor in series with an operational amplifier, the operational amplifier having a further resistor and capacitor in parallel with it.

The adder can include two resistors, such resistors being in series with an operational amplifier and the operational amplifier having a further resistor in parallel with it.

The invention is illustrated, merely by way of example, in the accompanying drawings in which.

Figure 1:
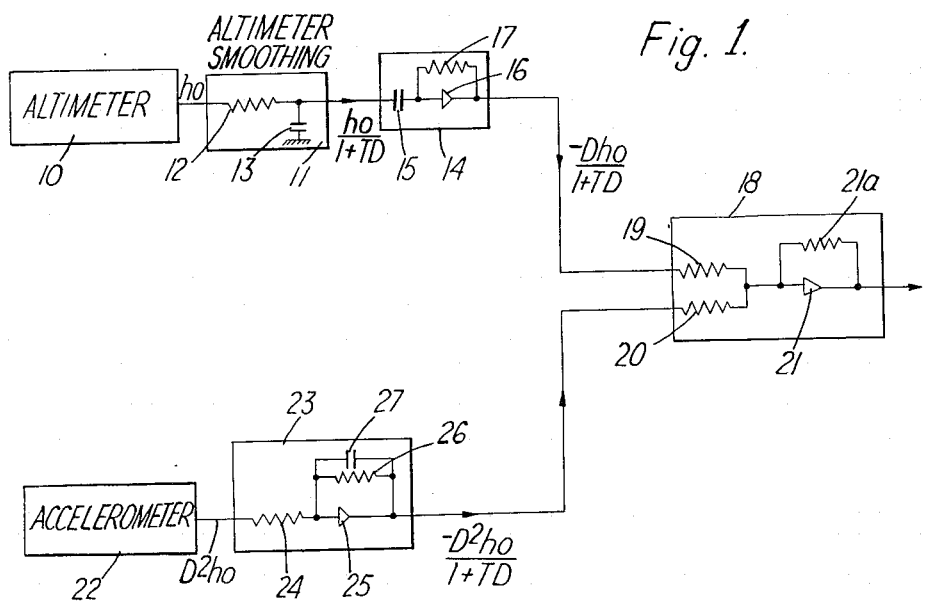
FIGURE 1 shows diagrammatically a complete system for producing a true velocity signal.

In FIGURE 1 is shown an altimeter 10 which produces a height signal $ho$ which is fed to a smoothing circuit 11 including a 2.5 K resistor 12 and 200 microfarad capacitor 13. The output of the smoothing circuit 11 is in the form $$\frac{ho}{1+TD}$$

and is fed to a differentiating circuit 14 comprising a 1 microfarad capacitor 15, an operational amplifier 16, and parallel 1 megohm resistor 17. D is the differential operator and T is a time constant.

The differentiated output is in the form $$-\frac{Dho}{1+TD}$$

and is fed to an adder 18. The adder 18 comprises a resistor 19 of 1 megohm and a resistor 20 of 2 megohms, the combination of resistors 19 and 20 being in series with an operational amplifier 21 which has a 1 megohm resistor 21a in parallel with it.

The accelerometer is shown at 22 and produces an acceleration signal $D^2ho$ which is fed to a circuit 23 comprising a 1 megohm resistor 24 in series with an operational amplifier 25. The operational amplifier 25 has in parallel with it a 1 megohm resistor 26 and a .5 microfarad capacitor 27. The circuit 23 introduces the same time function term $(1+TD)$ into the acceleration signal as is introduced into the height signal by the altimeter smoothing circuit. The acceleration signal, with the time function term in it, is applied to the adder 18.

The resistors 19, 20 are respectively of 1 and 2 megohms as stated above. Accordingly the algebraic sum of the signals fed to the amplifier 21 will be $$-\frac{Dho}{1+TD}-\frac{1}{2}\frac{D^2ho}{1+TD}=-\frac{Dho+\frac{1}{2}D^2ho}{1+TD}$$

But, as stated above, the resistor 12 is a 2.5K resistor and the capacitor 13 is a 200 microfarad capacitor.

Accordingly $T=(2.5\times10^3)\times200\times10^{-6}=0.5$ second.

Hence the algebraic sum of the signals fed to the amplifier 21 equals:

$$-\frac{Dho+TD^2ho}{1+TD}=-Dho$$

Accordingly the result is a true velocity signal ($Dho$), the time function term $(1+TD)$ being cancelled out during the algebraic addition.

Stated another way, the resistor 20 is of $$2 \text{ megohms}=\frac{1}{\frac{1}{2}} \text{ megohms}=\frac{1}{T} \text{ megohms}$$

Hence the function of the adder 18 is to add once the output signal of the differentiating circuit 14 to T times the output signal of the circuit 23 and invert the phase, the resultant signal having had the time function term removed from it.

Figure 3:
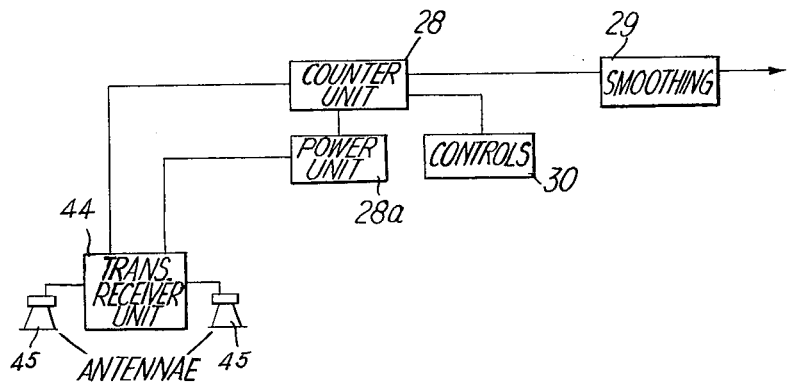
FIGURE 3 is a block diagram of an altimeter.

The altimeter is shown in FIGURE 3 and consists of a transmitter-receiver unit 44 including two antennae 45. The transmitter transmits on a continuously varying frequency and the received signal and transmitted signal are passed simultaneously to a counter unit 28. The counter unit and transmitter-receiver unit are supplied by a power unit 28a and the altimeter includes controls 30.

In the counter unit 28 the transmitted and received signals are mixed and pulses are produced from the resultant output, which pulses are integrated to produce a D.C. signal representative of height. The height signal is passed through a smoothing circuit 29 which corresponds to the smoothing circuit 11 in FIGURE 1.

Figure 4:
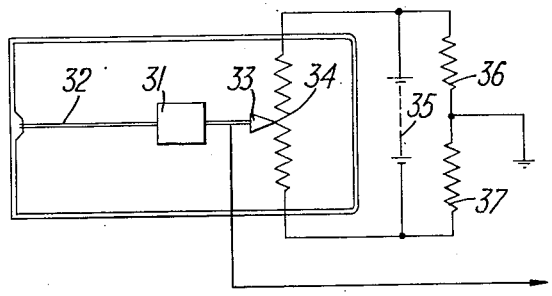
FIGURE 4 shows diagrammtically an accelerometer.

The accelerometer shown in FIGURE 4 consists of a weight 31 attached to a leaf spring 32. Also attached to the weight 31 is the movable arm 33 of a variable resistor 34. The variable resistor has its ends connected across a battery 35 which also has equal resistors 36 and 37 in series connected across it. The junction of resistors 36 and 37 is connected to earth.

The D.C. voltage on the movable arm 33 is zero when the accelerometer is not moving up or down, but upward or downward acceleration will cause a positive or negative signal respectively to be produced in the form of a D.C. voltage. This signal will be representative of the acceleration.

Figure 2:
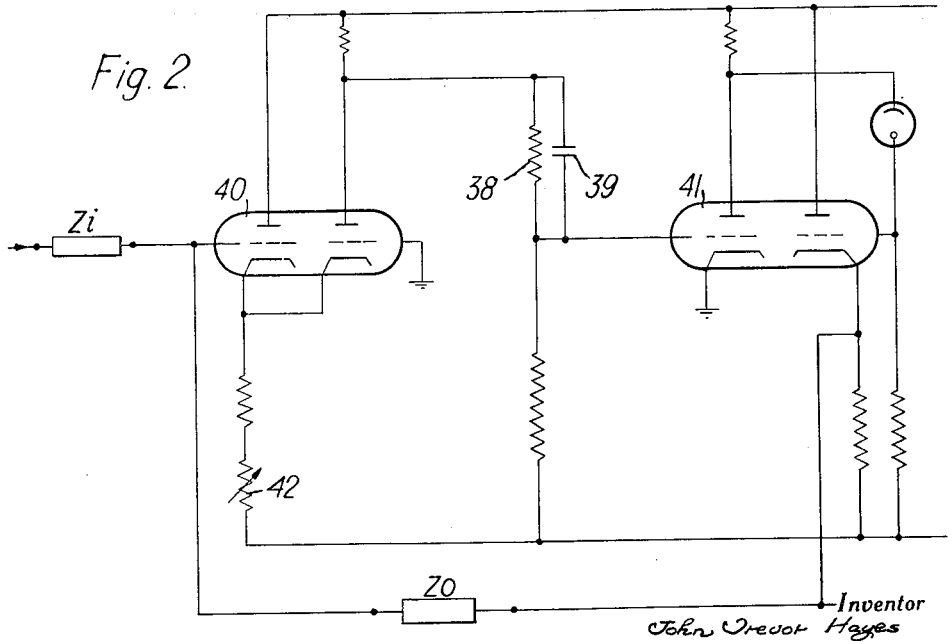
FIGURE 2 is a circuit diagram of an operational amplifier which can be substituted for any of the triangles shown in FIGURE 1.

The operational amplifier shown in FIGURE 2 has a series of impedance $Zi$ which is equivalent, for example, to the condenser 15 in the block 14 of FIGURE 1, and a parallel impedance $Zo$ which is equivalent to the resistor 17 in the block 14. The remainder of the circuit can be used in place of any of the triangles 16, 21 or 25. The circuit is quite conventional and consists of two amplifying stages to obtain the gain which must be high in order that the formula $$A = \frac{Zo}{Zi}$$

may be correct.

The first double triode 40 is connected as a long-tailed pair, which gives a choice of phase of output. The output from this stage is taken from the second anode and is in phase with the input voltage to give the desired overall negative feedback.

In the second double triode 41 the first half is used as an amplifier, the signal being inverted in phase; and the second half is used as a cathode follower to obtain a low output impedance so that connection of a succeeding amplifier would not affect the gain.

The resistance 38 of the operational amplifier is part of the coupling between stages. Capacitor 39 is introduced to correct for phase errors caused by valve interelectrode capacitances. The variable resistance 42 in the cathode circuit of the long tailed pair is a "set zero" pre-set control to obtain zero output for zero input.

Under constant height conditions, with zero velocity and zero acceleration, the output of the accelerometer is zero, and the output of the height differentiator is zero, so that the output of the adder, which represents the velocity signal is also zero, which is correct.

Under constant velocity conditions, if the velocity is $k$, the height, at any instant, is $kt$ and the acceleration is zero. The input to the adder from the accelerometer line is zero and from the altimeter line is $$\frac{-Dkt}{1+TD}$$

The adder output, or velocity signal is then $$v = \frac{Dkt}{1+TD}$$

Expanding by the binomial theorem $$v = D(1 - TD + T^2D^2 \ldots)kt$$
$$v = k, \text{ which is correct}$$

In this case, the constant error, which is introduced in the altimeter smoothing is eliminated in the differentiator.

I claim:

1. A device for obtaining a true velocity signal from a radio altimeter comprising a circuit for smoothing a height signal obtained from the altimeter, the smoothing circuit being such as to introduce into the height signal a term including a time function, a differentiating circuit serving to change the height signal to a velocity signal, an adder to which the velocity signal is fed, said smoothing circuit, differentiating circuit and adder being arranged successively in series, an accelerometer which produces an acceleration signal, means for introducing the same time function term into the acceleration signal, and means for feeding the acceleration signal to the adder, the adder being constructed and arranged to add the velocity and acceleration signals together algebraically in such proportions that the output is a true velocity signal, the time function term being cancelled out in the algebraical adding process.

2. A device for obtaining a true velocity signal from a radio altimeter comprising a resistor-capacitor circuit for smoothing a height signal obtained from the altimeter, the smoothing circuit being such as to introduce into the height signal a term including a time function, a differentiating circuit serving to change the height signal to a velocity signal, an adder to which the velocity signal is fed, said smoothing circuit, differentiating circuit and adder being arranged successively in series, an accelerometer which produces an acceleration signal, means for introducing the same time function term into the acceleration signal, and means for feeding the acceleration signal to the adder, the adder being constructed and arranged to add the velocity and acceleration signals together algebraically in such proportions that the output is a true velocity signal, the time function term being cancelled out in the algebraical adding process.

3. A device as claimed in claim 2 in which the said means for introducing the same time function term comprises a resistor, an operational amplifier in series with the resistor, and a further resistor and capacitor in parallel with the operational amplifier.

4. A device for obtaining a true velocity signal from a radio altimeter comprising a circuit for smoothing a height signal obtained from the altimeter, the smoothing circuit being such as to introduce into the height signal a term including a time function, a differentiating circuit serving to change the height signal to a velocity signal, an adder to which the velocity signal is fed, said adder comprising two parallel resistors, an operational amplifier in series therewith, and a further resistor in parallel with the operational amplifier, said smoothing circuit, differentiating circuit and adder being arranged successively in series, an accelerometer which produces an acceleration signal, means for introducing the same time function term into the acceleration signal, and means for feeding the acceleration signal to the adder, the adder being constructed and arranged to add the velocity and acceleration signals together algebraically in such proportions that the output is a true velocity signal, the time function term being cancelled out in the algebraical adding process.

5. A device for obtaining a true velocity signal from a radio altimeter comprising a curcuit for smoothing a height signal obtained from the altimeter, said smoothing circuit being constructed to introduce into the height signal a term including a time function, a differentiating circuit serving to change the height signal to a velocity signal, said differentiating circuit comprising a capacitor, an operational amplifier in series with the capacitor, and a resistor in parallel with said amplifier, an adder to which the velocity signal is fed, said smoothing circuit, differentiating circuit and adder being arranged successively in series, an accelerometer which produces an acceleration sigual, means for introducing the same time function term into the acceleration signal, and means for feeding the acceleration signal to the adder, the adder being constructed and arranged to add the velocity and acceleration signals together algebraically in such proportions that the output is a true velocity signal, the time function term being canceled out in the algebraical adding process.

6. A device for obtaining a true velocity signal from a radio altimeter comprising a circuit for smoothing a height signal obtained from the altimeter, the smoothing circuit being such as to introduce into the height signal a term including a time function, a differentiating circuit serving to change the height signal to a velocity signal, an adder to which the velocity signal is fed, said smoothing circuit, differentiating circuit and adder being arranged successively in series, a fixed structure and a weight carried thereby so as to move with respect thereto on acceleration thereof, means, controlled by the position of said weight with respect to the fixed structure, for producing an acceleration signal, means for introducing the same time function term into the acceleration signal, and means for feeding the acceleration signal to the adder, the adder serving to add the velocity and acceleration signals together algebraically in such proportions that the output is a true velocity signal, the time function term being canceled out in the algebraical adding process.

7. A device as claimed in claim 6 in which the acceleration signal producing means comprises a current source and a variable resistor connected across the current source, the variable resistor comprising a movable arm connected to said weight so as to move therewith.

8. A device for obtaining a true velocity signal comprising an altimeter incorporating a combined transmitter-receiver unit adapted to transmit a signal to ground so as to be reflected back thereby, a circuit for smoothing a height signal obtained from the altimeter, the smoothing circuit being such as to introduce into the height signal a term including a time function, a differentiating circuit serving to change the height signal to a velocity signal, an adder to which the velocity signal is fed, said smoothing circuit, differentiating circuit and adder being arranged successively in series, an accelerometer which produces an acceleration signal, means for introducing the same time function term into the acceleration signal, and means for feeding the acceleration signal to the adder, the adder being constructed and arranged to add the velocity and acceleration signals together algebraically in such proportions that the outpjut is a true velocity signal, the time function term being canceled out in the algebraical adding process.

9. A device as claimed in claim 8 in which the altimeter comprises means to vary the signal frequency with time, means for mixing the transmitted and received signals, whereby the resultant difference frequency varies according to the height of the altimeter above the ground, and a counter unit to which the mixed signal is passed, said counter unit being adapted to produce a signal representative of height.

References Cited in the file of this patent
UNITED STATES PATENTS 2,268,587    Guanella _____ Jan. 6, 1942

OTHER REFERENCES

"Measuring Rate-of-Climb" by S. H. Logue-Electronic Industries and Telle-Tech, October 1956, pages 74, 75, 146–149.